(12) United States Patent
Hestetun

(10) Patent No.: US 10,928,237 B2
(45) Date of Patent: Feb. 23, 2021

(54) FLOWMETER ARRANGEMENT FOR A FLOWLINE OR JUMPER

(71) Applicant: VETCO GRAY SCANDINAVIA AS, Sandvika (NO)

(72) Inventor: Steinar Lindemann Hestetun, Billingstad (NO)

(73) Assignee: VETCO GRAY SCANDINAVIA AS, Sandvika (NO)

(*) Notice: Subject to any disclaimer, the term of this patent is extended or adjusted under 35 U.S.C. 154(b) by 188 days.

(21) Appl. No.: 16/302,526

(22) PCT Filed: May 25, 2017

(86) PCT No.: PCT/EP2017/062700
§ 371 (c)(1),
(2) Date: Nov. 16, 2018

(87) PCT Pub. No.: WO2017/203013
PCT Pub. Date: Nov. 30, 2017

(65) Prior Publication Data
US 2019/0277685 A1    Sep. 12, 2019

(30) Foreign Application Priority Data

May 27, 2016  (NO) .................................. 20160910

(51) Int. Cl.
*G01F 15/18*   (2006.01)

(52) U.S. Cl.
CPC .................................. *G01F 15/185* (2013.01)

(58) Field of Classification Search
CPC .... G01F 15/185; E21B 33/076; E21B 33/035; E21B 33/038; E21B 34/04; E21B 49/001
See application file for complete search history.

(56) References Cited

U.S. PATENT DOCUMENTS 1,988,003 A    1/1935  Ford
2,576,630 A    11/1951 Mueller et al.
(Continued)

FOREIGN PATENT DOCUMENTS

EP    0763720 A1    3/1997

OTHER PUBLICATIONS

A Search Report issued in connection with corresponding NO Application No. 20160910 dated Dec. 23, 2016.
(Continued)

*Primary Examiner* — Francis C Gray
(74) *Attorney, Agent, or Firm* — Baker Hughes Patent Org.

(57) ABSTRACT

An arrangement for metering the flow of fluid in a flowline or jumper for transport of hydrocarbons, wherein the flowline or jumper is subjected to internal and external loads and forces which are taken up by the wall of the flowline or jumper. A metering pipe loop is adapted for installation of a flow metering instrument, the metering pipe loop having an inlet and an outlet respectively connected in fluid flow communication with the flowline or jumper on either side of a plug effectively directing all fluid in the flowline or jumper into the metering pipe loop, whereby the flow metering instrument installed in the metering pipe loop is isolated from the path of load which is defined by the flowline or jumper.

8 Claims, 2 Drawing Sheets

(56) References Cited

U.S. PATENT DOCUMENTS

| | | | | |
|---|---|---|---|---|
| 3,224,247 A * | 12/1965 | Barrett, Jr. | ..........  | G01F 25/0015 |
| | | | | 73/1.18 |
| 3,349,617 A * | 10/1967 | Hartstone | ................. | A01J 5/01 |
| | | | | 73/202 |
| 3,404,569 A * | 10/1968 | Young | ...................... | G01F 1/11 |
| | | | | 73/861.92 |
| 4,768,385 A | 9/1988 | Cage | | |
| 8,322,230 B2 | 12/2012 | Weinstein | | |
| 2010/0154533 A1 | 6/2010 | Al Sukhi et al. | | |
| 2013/0263951 A1* | 10/2013 | Gardner | ............. | F16K 11/0873 |
| | | | | 137/625.11 |
| 2014/0041463 A1* | 2/2014 | Vethe | ...................... | E21B 41/04 |
| | | | | 73/863.51 |
| 2015/0292291 A1* | 10/2015 | Donald | ................... | E21B 34/04 |
| | | | | 166/368 |

OTHER PUBLICATIONS

A Office Action issued in connection with corresponding NO Application No. 20160910 dated Dec. 23, 2016.

A PCT Search Report and Written Opinion issued in connection with corresponding Application No. PCT/EP2017/062700 dated Aug. 21, 2017.

* cited by examiner

FLOWMETER ARRANGEMENT FOR A FLOWLINE OR JUMPER

TECHNICAL FIELD

Embodiments of the present invention relate to the field of measuring the flow of fluid in flowlines or jumpers within the hydrocarbon industry.

BACKGROUND OF THE INVENTION

In the hydrocarbon industry, the process fluid is usually a multicomponent or multiphase fluid containing gas and liquid in varying proportions. Although multiphase fluid occurs also in other industries, there is a need and desire to measure the individual components of oil, water and gas streams in the hydrocarbon industry especially.

A traditional method for measuring multiphase flows includes separation of phases and subsequent measuring of each phase individually using single phase meters.

Multiphase meters are systems that measure the flow rates of individual components of multiphase fluid without previous separation. A multiphase flow meter (MPFM) measures the bulk flow rate of the mixed fluid, then calculates the individual phase fractions to determine the flow rates of the individual streams. The multiphase flow meters typically use several measuring techniques in combination since one technique alone is not enough to determine the individual flow rates of gas, oil and water. For example, multiphase flow meters can include differential pressure meters, densitometers, pressure gauges, electrical capacitance or inductance sensors, microwave or gamma ray transmitters for measuring density, flow disturbances, electrical properties, permittivity or absorption in multiphase fluid.

In the hydrocarbon industry, flow meters are usually installed in situ on a production flowline/jumper, manifold, Xmas tree or flow module. In subsea oil and gas production a flowline or jumper is a pipe connection used for transport of production fluid between two subsea components such as between Xmas tree and manifold or between manifold and riser, e.g.

Flowlines and jumpers used in the hydrocarbon industry are subjected to internal load and forces generated by the production stream that runs through the flowline or jumper as well as the free span load generated by the load of the jumper or flowline. Subsea flowlines and jumpers are additionally subjected to external forces applied from the surrounding sea. The wall of the flowline or jumper, whether it is rigid or flexible, is designed to withstand these forces and in absorbing the loads presenting a load path between the coupled ends of the flowline or jumper. The subject loads can be the single or combined effects of internal pressure, external bending, torsion, tension and thermal stress or installation loads, e.g.

In traditional practise, wherein flow meters or multiphase flow meters are integrated for in situ measurements in a production flow system, structural measures are required to reinforce the flow meter or the installation used for mounting the flowmeter in the flow. These structures add to the weight, installation efforts and costs for monitoring and control of hydrocarbon production.

SUMMARY OF THE INVENTION

Embodiments of the present invention aim at providing an improved arrangement for measuring the flow of fluid in a flowline or jumper.

It is a special object of embodiments of the present invention to provide a flow metering arrangement wherein a flow metering instrument is essentially isolated from the loads and forces that are concentrated to the wall of a flowline or jumper between the end terminations of the same.

The object is met in an arrangement for metering the flow of fluid in a flowline or jumper, wherein the flowline or jumper is subjected to internal and external loads and forces which are taken up by the wall of the flowline or jumper. A metering pipe loop is adapted for installation of a flow metering instrument, the metering pipe loop has an inlet and an outlet respectively connected in fluid flow communication with the flowline or jumper on either side of a plug effectively directing all fluid in the flowline or jumper into the metering pipe loop, whereby the flow metering instrument installed in the metering pipe loop is isolated from the path of load defined by the flowline or jumper.

By arranging the flow metering instrument as provided in embodiments of the present invention, the reinforcing structure which is traditionally required to protect the flow metering instrument from the subject loads and forces can be widely reduced or substantially eliminated.

The arrangement can be embodied through the metering pipe loop comprising a first pipe section which is connected to a first T-connection and a second pipe section which is connected to a second T-connection, a third pipe section connecting the first and second pipe sections in the ends remote from the T-connections, wherein the plug is installed between the T-connections for routing the fluid in the flowline or jumper into the first or second pipe section.

The metering pipe loop can be arranged as an assembly wherein individual components of the metering pipe loop are connectable in series, i.e. from the first blind T-connection to the second blind T-connection via the first pipe section, the third pipe section and the second pipe section. In this embodiment the plug can be realized as a cap designed for insertion between the T-connections, or as wall that closes an end of the straight portion of the T-connections. The components of the metering pipe loop can alternatively be formed integrally for installation on the flowline or jumper as a unit. In either way the straight portions of the interconnected T-connections (c.f. the horizontal bar of the capital letter T) provide a bridge that transfers the loads past the metering pipe loop, thus isolating the flow metering instrument from the subject loads.

In other words, according to embodiments of the present invention, the entire flow on which flow measuring is performed, is separated from the load path through the flowline or jumper.

Other details and embodiments of the present invention includes, e.g.:

a plug arranged with a cup-shaped face turned towards the flow through the flowline or jumper, a pocket in the blind T-connection supporting mixing of gas and liquid components upon entry of the fluid into the metering pipe loop, a single or multiphase flow metering instrument installed in the flow through the first or second pipe section of the metering pipe loop, a hub connection on one of the blind T-connections for coupling the metering pipe loop to a flexible flowline or jumper.

The flow metering pipe loop can be arranged with a coupling flange or be adapted for welding to a rigid flowline for operationally coupling the flow metering pipe loop to a wellhead, production tree, production flowline, riser, subsea pipeline, manifold, or an in-line Tee-connection, e.g.

Further details of embodiments of the invention will appear from the following detailed description.

BRIEF DESCRIPTION OF THE DRAWINGS

Embodiments of the present invention will be further discussed below with reference made to the accompanying drawings. In the drawings.

DETAILED DESCRIPTION

In the following description, the word flowline will be used to represent both rigid and flexible flowlines and jumpers or corresponding pipe components that are used for transport of production fluid in the hydrocarbon industry.

Figure 1:
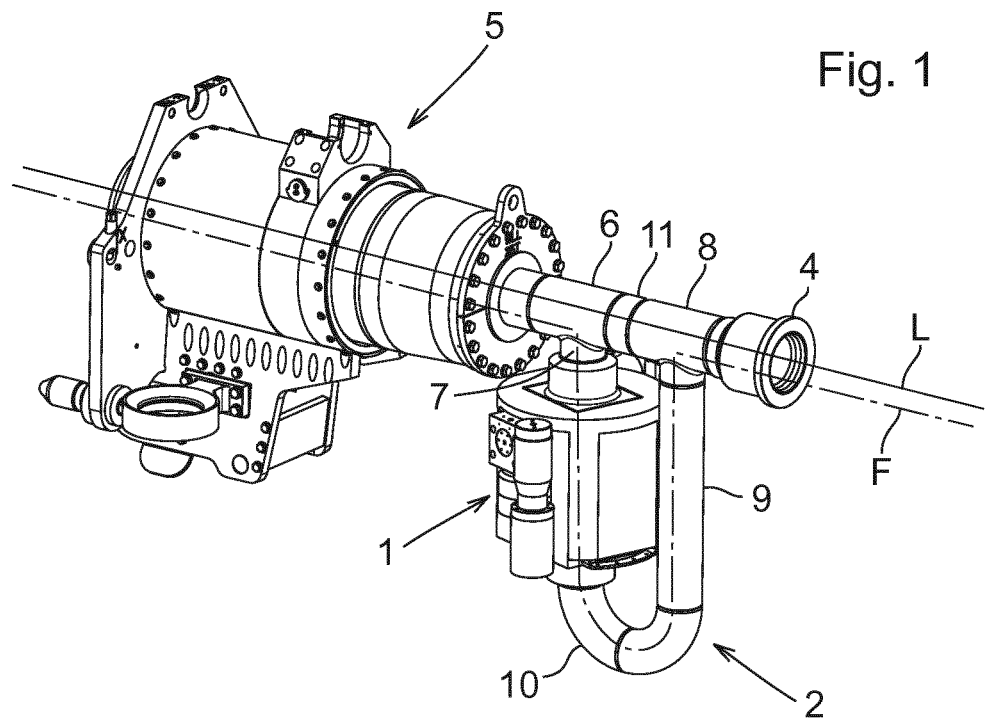
FIG. 1 is a 3-dimensional view showing a flowmeter installation on a horizontally oriented flowline or jumper.
Figure 2:
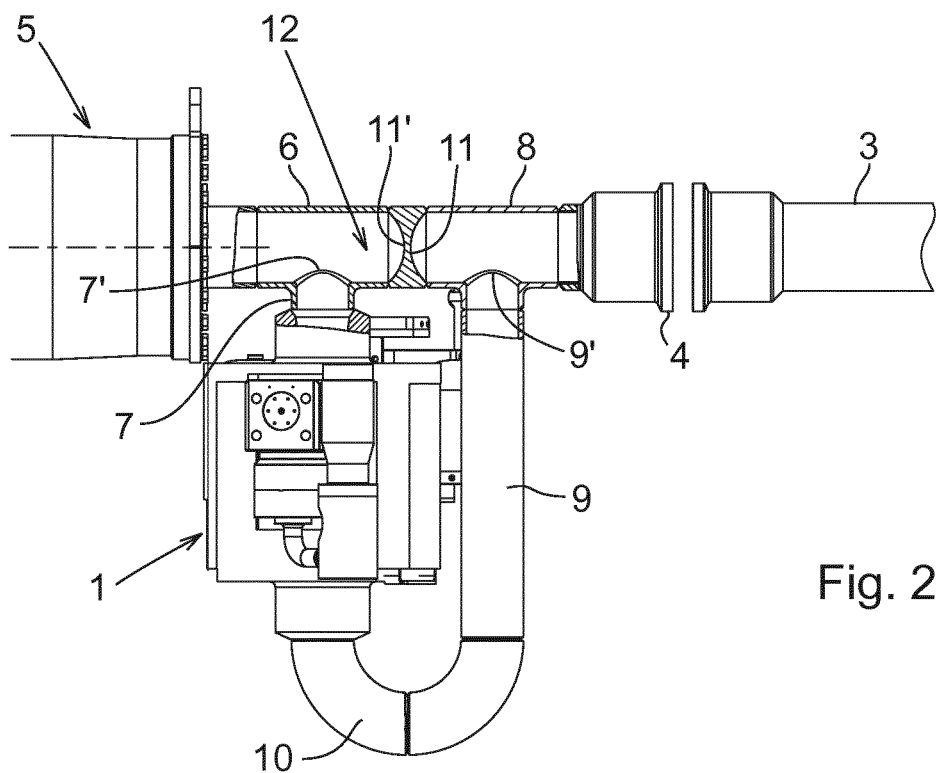
FIG. 2 is an elevational view showing a partially sectioned, cut out detail of the flowmeter installation of FIG. 1.

With reference to FIGS. 1 and 2, according to embodiments of the present invention, a flowmeter 1 is installed on a metering pipe loop 2 which can be connected to either end of a flowline 3 (see FIG. 2) by means of a flange 4 and connection means, such as bolts or a clamp connector (not shown). In the alternative, this end of the metering pipe loop can be adapted for welding to a rigid flowline. The other end of the metering pipe loop 7 is coupled to a termination connection 10 which is effective for connecting the flowline to production equipment.

The metering pipe loop 2 comprises a first T-connection 6 connected to a first pipe section 7 via an inlet 7', a second T-connection 8 connected to a second pipe section 9 via an outlet 9', a third pipe section 10 connecting the first and second pipe sections 7 and 9, and a plug 11 positioned between the T-connections. The first and second pipe sections 7 and 9 can be straight as illustrated, whereas the third pipe section 10 may be arcuate to permit a smooth inner duct for the flow through the metering pipe loop 2.

In effect of the plug 11 closing the passage for fluid in the straight portion of the T-connections, the T-connections 6 and 8 are shaped as blind tees. In other words, the upstream T-connection which faces the flow in the flowline will cause turbulence and mixing of fluid phases in a pocket 12 that is formed in front of the plug 11 in the T-connection. The plug 11 may have a cup-shaped face 11' turned towards the flow in the flowline. Accordingly, the gas and liquid components of the fluid are at least to some extent mixed before the fluid enters the metering pipe loop via the inlet 7'.

Although the entire flow is diverted into the flow metering loop 2, in FIG. 1 illustrated through a chain-dotted line F, the interconnected T-connections provide a continuous structure for an uninterrupted load path as illustrated by the continuous line L in FIG. 1. The flowmeter 1 is thus moved out from the load path and isolated from the internal and external forces which are transmitted in the wall of the flowline and through the straight structure portions of the T-connections.

Figure 3:
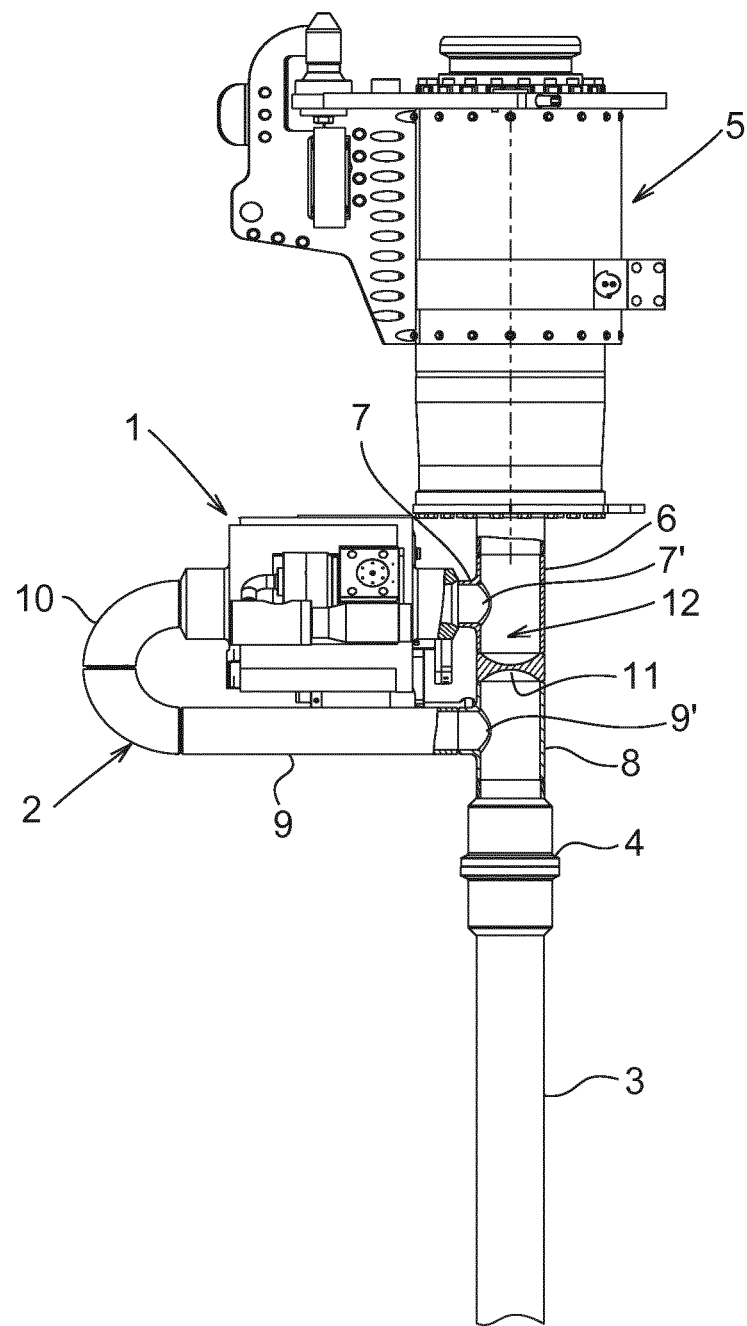
FIG. 3 is a planar view showing a flowmeter installation on a vertical section of a flowline or jumper.

It should be understood that the flow metering arrangement can be installed on a flowline at other orientations than the one depicted in FIGS. 1 and 2. Possible installations include any rotational position about a flowline, at horizontal orientation as depicted in FIG. 2, as well as any rotational position about a flowline at vertical orientation as depicted in FIG. 3.

Persons skilled in the art will appreciate the following improvements which is provided by embodiments of the present invention as compared to the prior art:
  greater versatility and flexibility
  lower weight
  no limitation with respect to flowline type (rigid or flexible)
  no limitation with respect to installation in first or second end of the flowline
  no limitation regarding size of single phase flowmeter/multiphase flowmeter
  no limitation with respect to thickness of thermal and other insulation of flowmeter/multiphase flowmeter.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An arrangement for metering the flow of fluid in a flowline or jumper, wherein the flowline or jumper is subjected to a load path of internal and external loads and forces which are taken up by the wall of the flowline or jumper, comprising:
   a metering pipe loop configured to receive a flow metering instrument, the metering pipe loop having an inlet and an outlet respectively connected in fluid flow communication with the flowline or jumper on either side of a plug effectively directing all fluid in the flowline or jumper into the metering pipe loop, wherein the flow metering instrument installed in the metering pipe loop is isolated from the load path that the flowline or jumper is subject to,
   the metering pipe loop comprising a first pipe section connected to a first T-connection and a second pipe section connected to a second T-connection, wherein the plug is installed in the load path extending through respective straight portions of the interconnected first and second T-connections effectively closing the straight portions of the first and second T-connections to route the fluid in the flowline or jumper into the first or second pipe section,
   wherein the straight portions of the interconnected first and second T-connections provide a bridge that transfers the load path past the metering pipe loop to isolate the flow metering instrument from the load path, and
   wherein the plug defines two opposing concave portions with one of the concave portions facing a flow channel of the first T connection and the other of the concave portions facing a flow channel of the second T connection.

2. The arrangement of claim 1, wherein the metering pipe loop further a third pipe section connecting the first pipe section and the second pipe section in ends remote from the first and second T-connections.

3. The arrangement of claim 1, wherein the T-connection is formed with a pocket for mixing gas and liquid components in the flow.

4. The arrangement of claim 1, wherein a single phase flowmeter or multiphase flowmeter is installed in the flow through either one of the first or second pipe sections of the flow metering pipe loop.

5. The arrangement of claim 2, wherein the flow metering pipe loop is connectable to the first or to the second end of a rigid or a flexible subsea flowline or jumper.

6. The arrangement of claim 5, wherein the flow metering pipe loop is arranged with a coupling flange.

7. The arrangement of claim 5, wherein the flow metering pipe loop is adapted for welding to a rigid flowline.

8. The arrangement of claim 2, wherein the flow metering pipe loop is adapted for operationally coupling the flow metering pipe loop to a wellhead, production tree, production flowline, riser, subsea pipeline, manifold, or an in-line T-connection.

\* \* \* \* \*